United States Patent
Glöckl (10) Patent No.: US 10,687,646 B2
(45) Date of Patent: Jun. 23, 2020

(54) FLOOR MAT

(71) Applicant: aeris GmbH, Haar b. Munich (DE)

(72) Inventor: Josef Glöckl, Kirchheim b. Munich (DE)

(73) Assignee: aeris GmbH, Haar b. Munich (DE)

(*) Notice: Subject to any disclaimer, the term of this patent is extended or adjusted under 35 U.S.C. 154(b) by 0 days.

(21) Appl. No.: 15/655,939

(22) Filed: Jul. 21, 2017

(65) Prior Publication Data

US 2018/0020858 A1 Jan. 25, 2018

(30) Foreign Application Priority Data

Jul. 22, 2016 (DE) .......................... 10 2016 113 585

(51) Int. Cl.
*A47G 27/02* (2006.01)
*B32B 3/26* (2006.01)
*B32B 5/18* (2006.01)
*B32B 25/14* (2006.01)

(52) U.S. Cl.
CPC .......... *A47G 27/0231* (2013.01); *B32B 3/263* (2013.01); *B32B 5/18* (2013.01); *B32B 25/14* (2013.01); *B32B 2307/746* (2013.01); *B32B 2471/04* (2013.01)

(58) Field of Classification Search
CPC ............ A47G 27/0212; A47G 27/0231; A47G 27/0237; A47G 27/02; A47G 27/0206; A47G 27/0218; B32B 3/30; B32B 2471/04; B32B 3/26; B32B 3/263; A61H 7/001; Y10T 428/24479; Y10T 428/24496; Y10T 428/24504; Y10T 428/24512; Y10T 428/25

USPC ........... 428/71, 76, 156, 158, 159, 160, 323; 5/417, 420; 4/581, 582
See application file for complete search history.

(56) References Cited

U.S. PATENT DOCUMENTS

| | | | |
|---|---|---|---|
| 2,057,171 A | 10/1936 | Van Der Pyl | |
| 3,434,715 A | 10/1966 | Brantingham et al. | |
| 5,158,073 A | 10/1992 | Bukowski | |
| 5,601,900 A * | 2/1997 | Doscher | A47G 27/0212 238/14 |
| 5,787,655 A | 8/1998 | Saylor, Jr. | |
| 6,219,876 B1 * | 4/2001 | Blum | A47L 23/22 15/215 |
| 7,670,026 B1 | 3/2010 | Hawkins | |

(Continued)

FOREIGN PATENT DOCUMENTS

| | | | | |
|---|---|---|---|---|
| CN | 102793454 A | | 11/2012 | |
| GB | 2123696 A | * | 2/1984 | A61H 39/04 |

OTHER PUBLICATIONS

International Preliminary Report on Patentability and Written Opinion dated Jan. 31, 2019 received in related International Application No. PCT/EP2017/066192 together with an English language translation.

*Primary Examiner* — Catherine A. Simone
(74) *Attorney, Agent, or Firm* — Scully Scott Murphy and Presser (57) ABSTRACT

A floor mat (1) at a standing workstation with a mat surface (4) is disclosed, which comprises a mat structure (2) made of an elastomer material and formed beneath the mat surface (4), in which irregularly distributed elements (3) are arranged, the consistency of which is harder than the consistency of the elastomer material of the mat structure (2).

12 Claims, 8 Drawing Sheets

(56) References Cited

U.S. PATENT DOCUMENTS

| | | | |
|---|---|---|---|
| 2002/0114926 A1* | 8/2002 | Malpass | A47G 27/0412 |
| | | | 428/156 |
| 2008/0262579 A1 | 10/2008 | Berk et al. | |
| 2011/0240212 A1* | 10/2011 | McMahan | A47G 27/0231 |
| | | | 156/242 |
| 2014/0342126 A1* | 11/2014 | Oh | B32B 37/14 |
| | | | 428/160 |
| 2015/0374157 A1 | 12/2015 | Bone | |

* cited by examiner

FLOOR MAT

BACKGROUND OF THE INVENTION

The invention relates to a floor mat for use at a standing workstation.

DISCUSSION OF THE PRIOR ART

In general, working at a standing workstation is preferable to working at a sitting workstation, for example, at a desk. For an employee, it is particularly advantageous, on the one hand, if the opportunity for occasionally sitting, or leaning against a standing stool, is provided, and, on the other hand, if a place to stand is provided, opportunities which make it possible to work largely fatigue-free.

Fatigue while working in a standing position can substantially be reduced by a so-called active mat. Therefore, mats for standing workstations should be constructed so that they delay fatigue and also help prevent health problems in general.

However, although various mats are available for a standing workstation, they lead to fatigue of the feet and of the legs within a relatively short time. They often consist of a homogeneous PUR integral soft foam and/or, on their surface, they can comprise an arrangement of round disks, which, on the one hand, lead to a relatively safer footfall, and, on the other hand, have the effect of orienting the feet. Other mats in turn are provided with a hemispherical profile on the upper side. The mentioned designs on the surface are intended to delay foot and leg fatigue or at least reduce such fatigue.

However, for longer periods of work in a standing position at one place, these known mats are not suited for preventing fatigue and maintaining alertness and freshness, in spite of their surface design and softness, because the proprioceptors are not activated sufficiently. It is precisely a soft structure of the mat that is counterproductive in this regard. As time spent working in a standing position goes on, the person who is working in a standing position has the sensation of no longer feeling the legs and there is an increased need for another body posture—the person allows himself to fall into the closest armchair. Thus, excitation needs to be provided for the feet and legs if fatigue phenomena are to be prevented or at least delayed.

BRIEF SUMMARY OF THE INVENTION

It is the object of the invention to provide a mat which helps reduce foot fatigue while working in standing position.

The object is attained according to the invention by the floor mat with a mat surface at a standing workstation, wherein a mat structure formed beneath the mat surface consists of an elastomer material, in which irregularly distributed elements are arranged, the consistency of which is harder than the consistency of the elastomer material of the mat structure.

In this context, it is advantageous that the elements with the harder consistency are provided by means of different materials and that the mat structure made of elastomer material extends essentially homogeneously on the mat surface.

The areas of different hardness, i.e., the elements, continuously apply different tactile excitations to the soles of the feet, as a result of which a monotonous planar continuous stressing of the sole of the foot is avoided. The constant excitation is perceived by the brain, which has to react and therefore remains attentive and awake longer.

As a result of the flat surface, it is avoided, on the one hand, that, with movement of the feet, the feet become remain accidentally stuck to the surface structures such as knobs or disks. On the other hand, due to the arrangement of the soft layer beneath the surface, it is achieved that the different hard areas can be perceived clearly by the feet.

The mat structure is arranged on a base part on/at which the elements are designed in the form of bumps.

The hard elements, forming separate inclusions, can be partially surrounded in the mat by the softer material and supported from below on a hard layer. As a result, the elements can then be perceived by the feet themselves when one stands on the mat wearing thick-soled shoes.

Advantageously, the bumps extend upward different heights. As a result, the foot experiences different pressure excitations.

If the elements which are harder than the material of the mat structure are designed to form three-dimensional bodies in the shape of cubes, cuboids, truncated cones, barrels of different dimensions, or the like, then the multitude of individual perceptions is increased, and the available excitations are numerous and highly varied, so that a great perception potential is offered. This can be increased further, in that the bodies are shaped regularly and irregularly, and arranged at a slant on a support layer. Naturally, regularly and irregularly shaped bodies can be arranged distributed over the mat surface.

Between the irregularly distributed elements, special free areas are advantageously arranged, the surface area of which is larger than the average distance apart of all the elements. As a result, an area without pressure is available for the foot, resulting in a certain variation of sensations. The mat structure is designed as an upper part of the floor mat with recesses formed therein, in which the hard elements (3) are accommodated.

The base part comprises a bottom layer and can be designed as a prefabricated component, which, as an insert part, is at least partially surrounded by foam during the production of the upper part.

Behind its peripheral margin, the upper part comprises an inward directed groove, in which the outer margin of the base part is accommodated. Moreover, the marginal area is designed with a peripheral bevel.

BRIEF DESCRIPTION OF THE DRAWINGS

Other advantageous developments of the invention are characterized in the dependent claims and represented in greater detail below together with the description of the preferred embodiments of the invention in reference to the figures. The figures show:

DETAILED DESCRIPTION OF THE INVENTION

Figure 1:
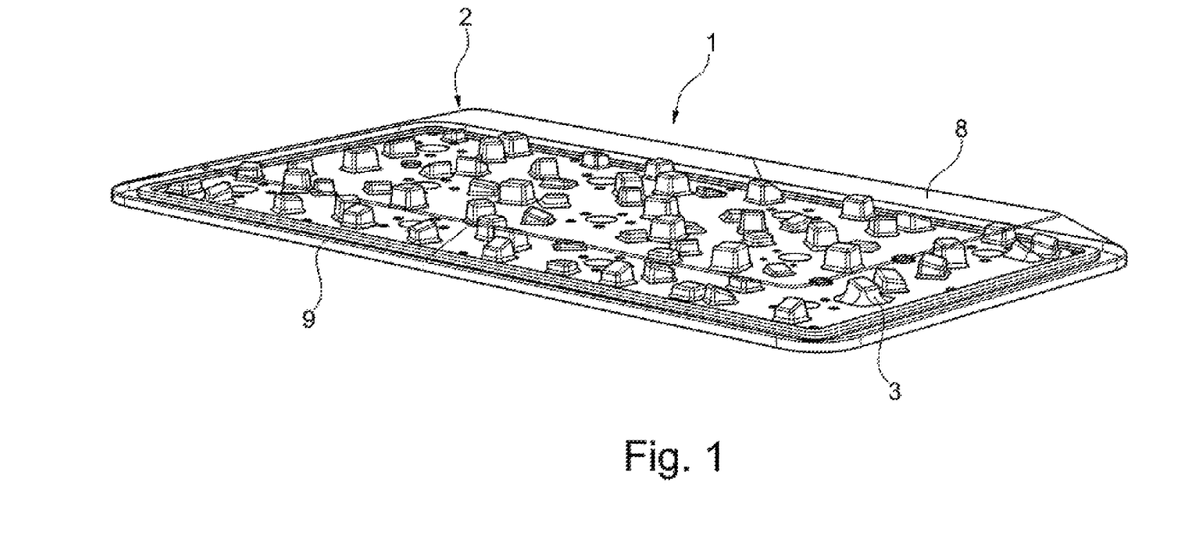
FIG. 1 a perspective representation of a first exemplary embodiment of an inventive mat in a view from above diagonally to the right, FIG. 2 a perspective representation of a second exemplary embodiment of an inventive mat in a view from above diagonally to the right the right, with a device for fastening a label, FIG. 3 a top view onto a mat according to the second exemplary embodiment, FIG. 4 a side view of a subarea of a mat according to the second exemplary embodiment, FIG. 5 an exploded view in a perspective representation of the second exemplary embodiment of the inventive mat from above diagonally to the right, with an upper part and a base part, FIG. 6 an exploded view in a perspective representation of the second exemplary embodiment of the inventive mat from below diagonally to the right, FIG. 7 the upper part of the mat according to the first exemplary embodiment in a view from below, FIG. 8 a partial perspective view of the upper part of the second exemplary embodiment from below, FIG. 9 a) the base part of the bottom mat with the elements according to the first exemplary embodiment arranged thereon, in a top view, FIG. 9 b) the base part of the floor mat with the elements according to the first exemplary embodiment arranged thereon, in a side view.

FIG. 1 is a perspective representation of a first exemplary embodiment of an inventive floor mat 1 in a view from above diagonally to the right. The mat is used at a standing workstation. Depending on the site of use, the dimensions thereof can vary, and, in general, the width is between 80 cm and 150 cm, the depth between 50 cm and 100 cm, and the thickness between 3 cm and 12 cm. The represented floor mat 1 comprises at least two different structures 2, 3 with different material properties, namely, on the one hand, a softer consistency, and, on the other hand, a harder consistency. The harder structures 3 are arranged irregularly distributed in the mat. The softer material consists of an elastomer material and forms an upper part 8 with a flat mat surface 4.

The different structural or material properties are provided by means of different materials, wherein the softer material of the upper part 8 is an elastomer foam material, which extends substantially homogeneously beneath the mat surface 4.

The upper part 8 is arranged on a base part 9, which is explained in further detail below.

Figure 2:
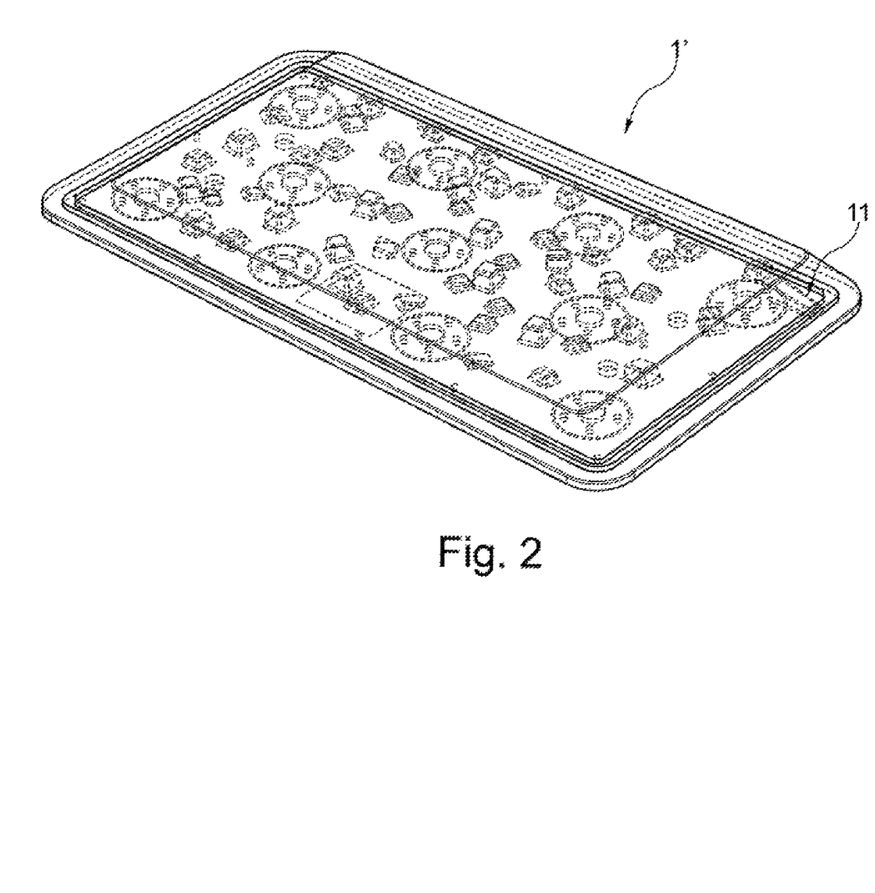
Figure 5:
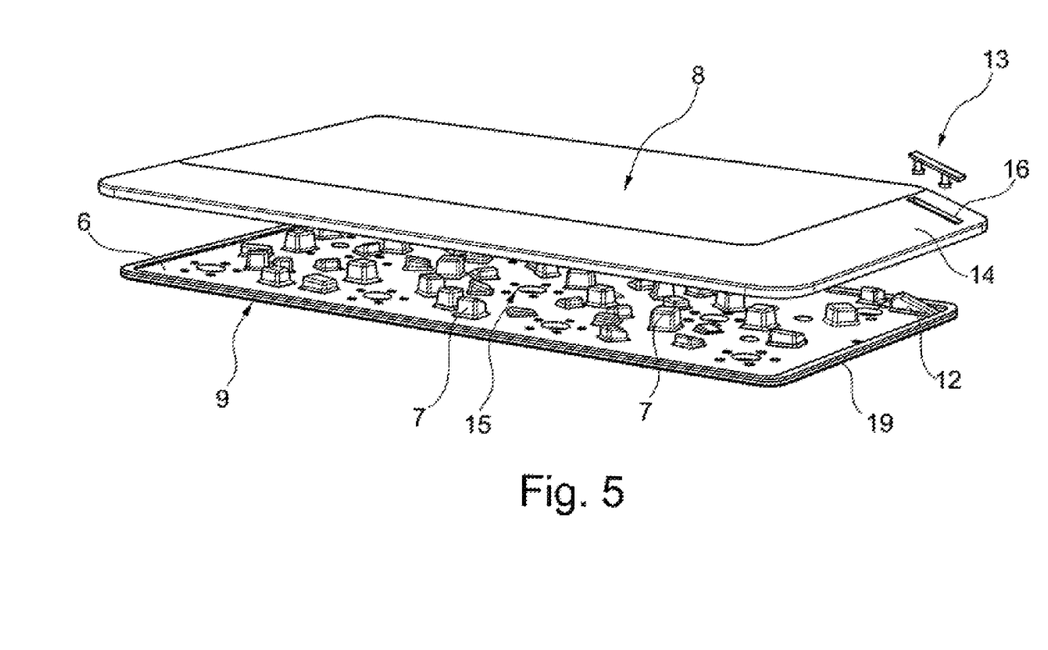

FIG. 2 shows a perspective representation of a second exemplary embodiment of an inventive mat 1' in a view from above diagonally to the right, with a device 11 for fastening a recess 12 for a plate 13, compare FIG. 5.

Figure 3:
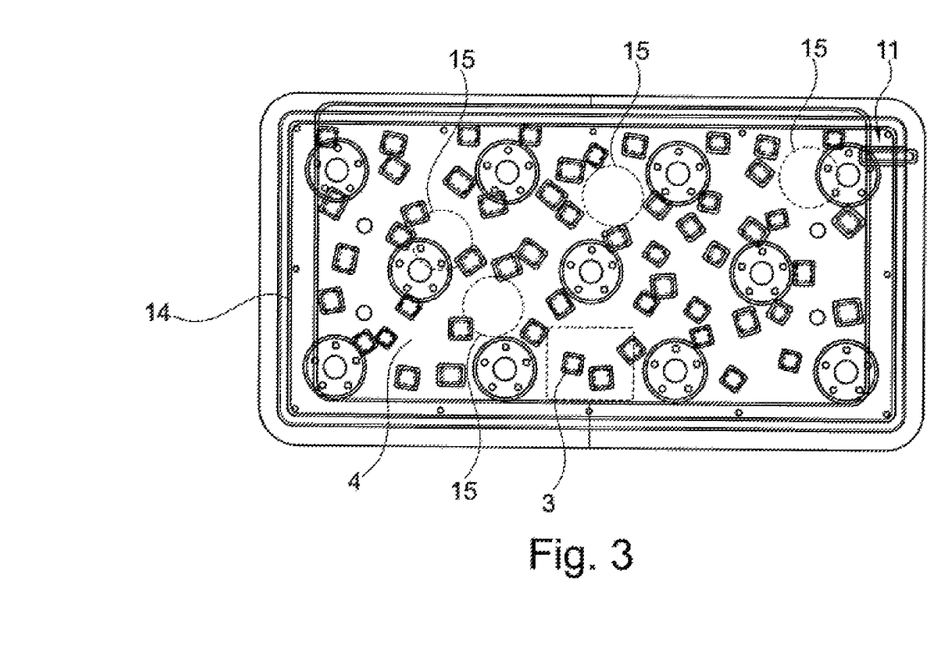

A top view onto the mat 1' according to the second exemplary embodiment is represented in FIG. 3. In comparison to the surface area of the base layer 6 of the base part 9, the mat surface 4 is slightly smaller and offset back inward by a bevel 14. In the exemplary embodiment represented, the slanted surface of the bevel is designed to be steeper in the rear area of the mat than the bevels on the side and on the front edge. In the representation of FIG. 3, larger areas as free spaces 15 are marked with circles surrounding them, in which there are no hard structures. In these areas 15, the soft material extends without interruption through an insertion or a bump 7 from the mat surface of the upper part 8 to the base layer 6 of the base part. When a user is standing on such a place, the foot gently sinks in. However, when the user changes place, the foot then stands on at least one bump 7 or 7'.

Figure 4:
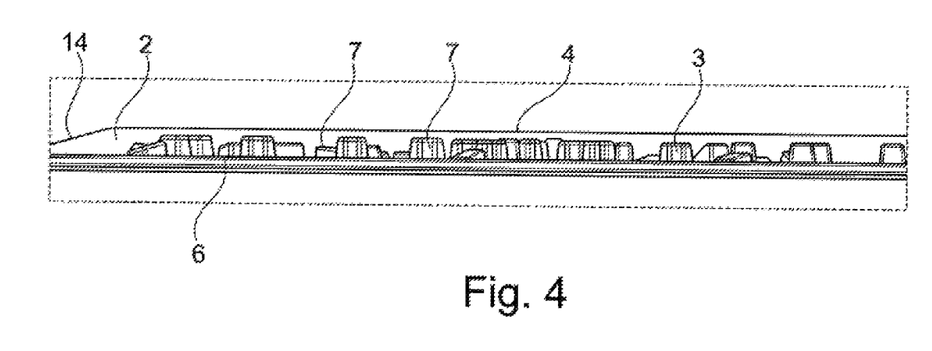

As can be seen from FIG. 4, the bumps 7 forming the elements 3 have different heights, so that the pressure on the soles of the feet is also of different intensity. This has the consequence that the user often changes posture and the place where he puts the foot and is thus constantly in motion. The different pressure excitations on the soles of the feet activate the receptors and reflex zones, and, as a result, brain activity is in turn stimulated.

FIG. 5 shows an exploded view of the second exemplary embodiment of the inventive floor mat in a perspective representation from above diagonally to the right, with the upper part 8 and the base part 9. The different bumps 7 on the bottom layer of the base part 9 and also the free spaces 15 between the bumps are distributed irregularly, shows a top view on the. The footfall surface of the upper part 8 of the floor mat is delimited by the bevel 14, wherein the rear bevel is designed to be steeper than the three bevels on the remaining margins. The base part 9 comprises a peripheral margin 19, on the bottom side of which a shoulder 20, offset back inward, is formed, compare also FIG. 6.

The plate 13 provided in the upper part 8 to the side in the area of the bevel comprises two buttoning feet which can be buttoned into the recess 12 through a slit 16 cut out in the bevel.

Figure 6:
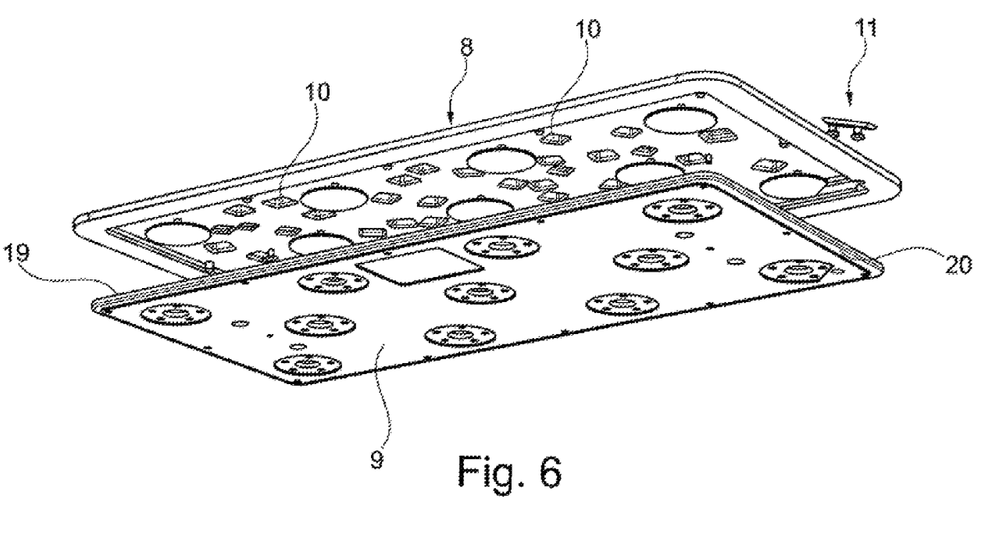

FIG. 6 shows an exploded view in perspective representation of the second exemplary embodiment of the inventive mat from below diagonally to the right. In the upper part, recesses 10 are formed, which extend upward from the underside of the upper part. After the assembly of the upper part to the base part, the bumps 7 of the base part 9 enter these recesses 10. Beneath the peripheral margin of the base part, a shoulder 20 is formed.

Figure 7:
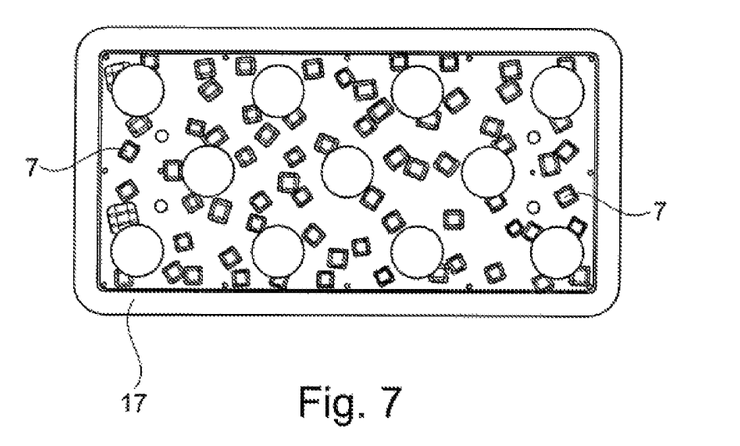

FIG. 7 shows a view of the upper part 8 of the mat from below.

Figure 8:
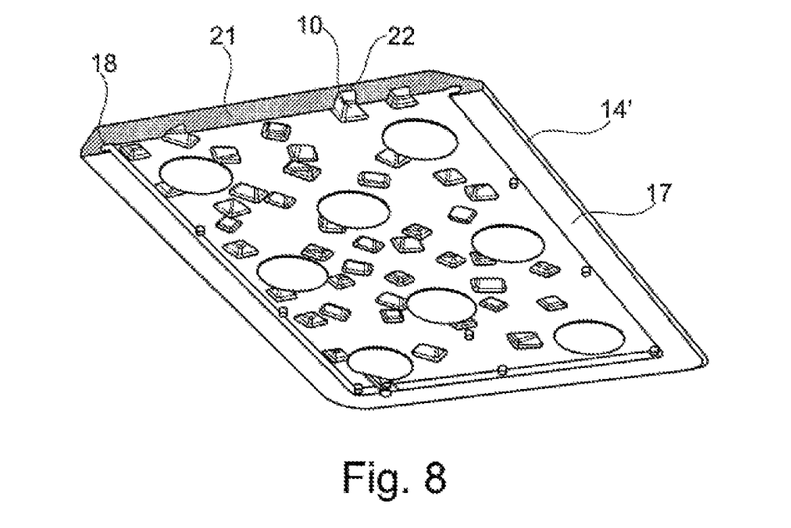

In FIG. 8, a perspective view of transversely cut upper part is represented at a slant from below. In the plane 21 of the cut through the upper part, the recesses 10 for the bumps are represented, which in part lie in the cutting plane, wherein the reference numeral 22 designates the material thickness between the mat surface of the upper part and a recess. In the plane of the cut, a receiving groove 18 can be seen, the downward turned groove wall of which adjoins a support surface 17 or forms a portion of the support surface 17 itself.

Moreover, as shown by the side view of the upper part 8 reproduced in FIG. 8, a peripheral vertical margin 14' is formed on the upper part 8, which ends at the support surface 17 of the mat. The support surface 17 thus forms the lower side wall of the receiving groove 18 extending peripherally within the margin 14', in which receiving groove the peripheral side margin 19 of the base part 9 engages after the assembly of the upper part and the base part.

Figure 9A:
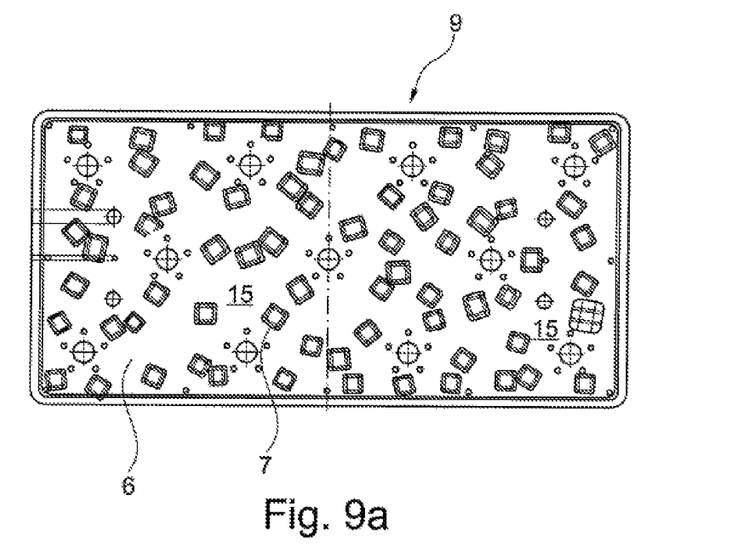
Figure 9B:
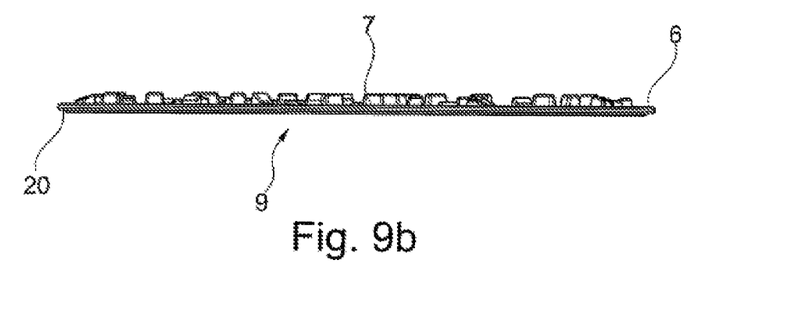

The base part 9 of the floor mat with the elements 3 arranged thereon according to the first exemplary embodiment is represented in different views in FIGS. 9a) and 9b). Here, FIG. 9 a) shows the top view and FIG. 9 b) the side view; in the two views, the random distribution of the bumps 7 forming the elements 3 and the free spaces 15 in between can be seen clearly.

The inventive mat can be provided with an anti-slip arrangement. This anti-slip arrangement can consist of an application of a soft rubber layer. Depending on the subsurface, another arrangement can also be selected, which, in any case, ensures that the mat remains stationary.

The invention is not limited in its implementation to the preferred exemplary embodiments indicated above. Rather, numerous variants are conceivable, which use the represented solution even in designs that are of fundamentally different type. Thus, the shape of the bumps can deviate from the angular shape, the bumps can consist, for example, of spheres or other bodies with curved surfaces facing the foot.

The invention claimed is:

1. A floor mat at a standing workstation with a mat surface, comprising a mat structure made of an elastomer material and formed beneath the mat surface, in which said elastomer material, irregularly distributed elements are arranged, the consistency of said irregularly distributed elements being harder than the consistency of the elastomer material of the mat structure, wherein said elements are differently shaped bodies, and wherein the mat structure comprises an upper part with recesses formed therein, in which said irregularly distributed elements can be accommodated.

2. The floor mat according to claim 1, wherein the mat surface is formed flat, and wherein the elements with the harder consistency are provided by means of different materials, and in that the mat structure made of elastomer material extends substantially homogeneously on the mat surface.

3. The floor mat according to claim 1, wherein the mat structure is arranged on a base part on/at which the elements are designed in the shape of bumps.

4. The floor mat according to claim 3, wherein the bumps extend upward different heights.

5. The floor mat according to claim 1, wherein the elements have different lengths in the respective longitudinal directions thereof.

6. The floor mat according to claim 1, wherein the elements consist of hard inserts, which are designed to have different sizes and arranged on a bottom layer.

7. The floor mat according to claim 1, wherein between the irregularly distributed elements, special free areas are arranged, and wherein the surface area of each said free area is larger than the average distance between all the elements.

8. The floor mat according to claim 3, wherein the mat structure is designed as an upper part made of a foamed elastomer material, and the base part comprises a bottom layer and is a prefabricated component, which, as an insert part, is at least partially surrounded by foam during the production of the upper part.

9. The floor mat according to claim 1, wherein a device for labeling of the mat is formed so as to be visible from above on the mat.

10. The floor mat according to claim 9, wherein the device for labeling of the mat comprises a recess arranged on the base part and a plate which can be attached to the recess.

11. The floor mat according to claim 3, wherein the base part is provided with an anti-slip arrangement.

12. The floor mat according to claim 1, further comprising a peripheral bevel formed at a margin of the floor mat.

* * * * *